United States Patent [19]

Scholz

[11] Patent Number: 4,892,794

[45] Date of Patent: Jan. 9, 1990

[54] BATTERY

[75] Inventor: Matthew T. Scholz, Woodbury, Minn.

[73] Assignee: Minnesota Mining and Manufacturing Company, St. Paul, Minn.

[21] Appl. No.: 220,661

[22] Filed: Jul. 18, 1988

[51] Int. Cl.⁴ .......................................... H01M 10/02
[52] U.S. Cl. ...................................... 429/72; 429/129; 429/163
[58] Field of Search ........................ 429/57, 59, 60, 63, 429/72, 80, 247, 129, 131, 132, 163

[56] References Cited

U.S. PATENT DOCUMENTS

| | | | |
|---|---|---|---|
| 2,132,224 | 10/1938 | Snyder | 251/147 |
| 2,988,584 | 6/1961 | Peters | 429/247 |
| 3,186,877 | 6/1965 | Stanimirovitch | 429/247 |
| 3,219,487 | 11/1965 | Krouse et al. | 429/72 |
| 3,379,573 | 4/1968 | Gershberg | 136/86 |
| 3,390,067 | 6/1968 | Miller et al. | 204/159.17 |
| 3,410,726 | 11/1968 | Harivel | 136/6 |
| 3,497,104 | 2/1970 | White | 220/44 |
| 3,497,396 | 2/1970 | Goodwin | 136/179 |
| 3,536,537 | 10/1970 | Solomon | 136/120 |
| 3,847,676 | 11/1974 | Palmer et al. | 136/148 |
| 3,864,168 | 2/1975 | Casey, Jr. et al. | 136/6 |
| 3,870,567 | 3/1975 | Palmer et al. | 136/148 |
| 3,892,594 | 7/1975 | Charlesby et al. | 136/148 |
| 3,909,302 | 9/1975 | Mermelstein | 136/177 |
| 3,930,890 | 1/1976 | Dietz | 136/179 |
| 4,091,184 | 5/1978 | Erisman et al. | 429/139 |
| 4,127,703 | 11/1978 | Holleck | 429/57 |
| 4,168,298 | 9/1979 | Fitzgerald | 428/224 |
| 4,252,868 | 2/1981 | Bohm et al. | 429/41 |
| 4,252,878 | 2/1981 | Lazarz et al. | 429/250 |
| 4,350,745 | 9/1982 | Parsen et al. | 429/57 |
| 4,374,907 | 2/1983 | Chuang et al. | 429/57 |
| 4,447,508 | 5/1984 | Jensen | 429/57 |
| 4,584,248 | 4/1986 | Iwata | 429/54 |
| 4,636,446 | 1/1987 | Lee | 429/54 |
| 4,728,876 | 3/1988 | Mongeon et al. | 320/2 |

FOREIGN PATENT DOCUMENTS 2317804 3/1977 Fed. Rep. of Germany .

OTHER PUBLICATIONS

AATCC Test Method 118-1982, Oil Repellency: Hydrocarbon Resistance Test, 61 AATCC Technical Manual 195 (Research Triangle Park, N.C., 1986).
TAPPI Official Test Method T 460 om-83 Surface Tension of Methyl Alcohol in Water, CRC Handbook of Chemistry and Physics, F-34 (69th ed., 1988).

Primary Examiner—Donald L. Walton
Attorney, Agent, or Firm—Donald M. Sell; Walter N. Kirn; Stephen W. Bauer

[57] ABSTRACT

A battery adapted to withstand high temperatures, such as generated during heat and/or steam sterilization. The battery comprises a casing defining at least one battery cell, aqueous fluid electrolyte in the cell, an electrode assembly in the cell including cooperating positive and negative electrodes immersed in the electrolyte, and a vent in the casing for venting gases and pressure during recharging and heat-sterilizing. Porous material (e.g., a hydrophobic material, such as a polytetrafluoroethylene felt pad) is provided in the cell generally adjacent the electrode assembly for holding excess electrolyte. The porous material has a hydrophobicity sufficiently large relative to the electrode assembly that electrolyte in the porous material tends to migrate into the electrode assembly to wet the electrodes while excess electrolyte is stored in the porous material. The porous material may be pretreated with a surfactant to be hydrophilic so that the material wicks aqueous electrolyte, the surfactant deteriorating after the electrolyte is wicked so that the porous material has the aforesaid hydrophobicity.

16 Claims, 2 Drawing Sheets

BATTERY

The invention relates generally to batteries, and more particularly to a vented battery that is adapted to withstand high temperatures, such as generated during heat and/or steam sterilization in an autoclave, with minimal loss of electrolyte and that is designed for powering orthopedic surgical instruments.

BACKGROUND OF THE INVENTION

Batteries that are designed to withstand high temperatures, e.g., 270 degrees Fahrenheit (132 degrees Celsius), are typically vented to permit gas to escape and prevent excessive pressure in the battery. Battery vents, however, may permit electrolyte to escape when the battery is held with the vent below the level of the electrolyte, such as frequently occurs if the battery is attached to a hand-held powered device. Electrolyte may also escape during heat-sterilization if the battery is carelessly placed in an autoclave with the vent below the level of the electrolyte. One approach for preventing escape of electrolyte is to place a relief-valve in the vent, which reduces loss of electrolyte in normal operation but which does not prevent the discharge of electrolyte when the pressure in the battery is sufficient to open the relief-valve. As a result of the gradual loss of electrolyte through a vent, the operation of vented batteries ha been impaired before their components have worn out.

These problems with vented batteries have been particularly troublesome when the batteries are used to power orthopedic surgical instruments, which generally require high power and a high degree of reliability. These batteries are usually heat sterilized between each use, and have sufficient capacity to power the instrument during a potentially complicated and time-consuming surgical operation. It is especially important that sufficient electrolyte be retained to completely wet the electrodes throughout the life of the battery. In addition, it is unacceptable for electrolyte to leak from the battery during a surgical operation.

SUMMARY OF THE INVENTION

The present invention provides a battery that is adapted to withstand high temperatures, such as generated during heat or steam sterilization in an autoclave, with minimal loss of electrolyte and that is designed for powering various portable powered devices, such as orthopedic surgical instruments; that is designed to hold excess electrolyte adjacent the electrodes so that it does not leak from the battery during use or sterilization while permitting migration of electrolyte to the electrodes; and that can withstand a significantly large number (e.g., over 300) of high temperature sterilization cycles in an autoclave without significant loss of capacity.

Generally, a battery of the present invention comprises a casing defining at least one battery cell, electrolyte in the cell, and an electrode assembly including cooperating positive and negative electrodes immersed in the electrolyte. The battery further includes a vent in the casing for venting gases and pressure during recharging and heat-sterilizing, and porous material in the cell generally adjacent the electrode assembly for holding excess electrolyte. The porous material has an affinity for the electrolyte sufficiently less than the affinity of the electrode assembly for the electrolyte such that electrolyte in the porous material tends to migrate into the electrode assembly to wet the the electrodes while excess electrolyte is stored in the porous material.

In a second aspect of this invention, the battery includes aqueous fluid electrolyte in the battery cell, and porous material having a hydrophobicity sufficiently large relative to the electrode assembly that electrolyte in the porous material tends to migrate into the electrode assembly to wet the electrodes while excess electrolyte is stored in the porous material. For example, the porous material may be hydrophobic and the electrode assembly hydrophilic.

Other features will be in part apparent and in part pointed out hereinafter.

BRIEF DESCRIPTION OF THE DRAWINGS

The present invention will be further described with reference to the drawings wherein corresponding reference characters indicate corresponding parts throughout the several views of the drawings, and wherein.

DETAILED DESCRIPTION

Figure 2:
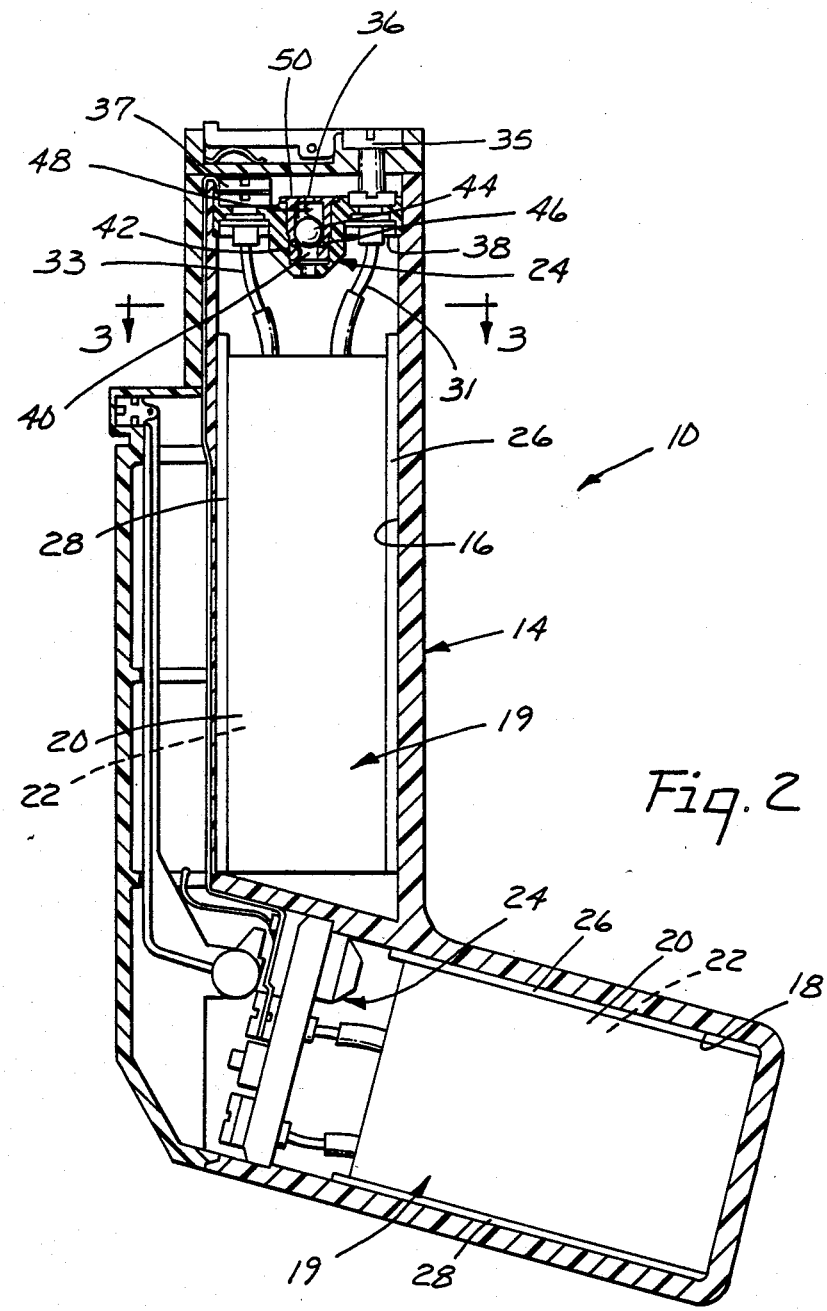
FIG. 2 is an enlarged cross-sectional view substantially along a plane dividing the battery of FIG. 1 into two substantially symmetrical portions.

Now referring to the drawings, a battery of the present invention is designated in its entirety by the reference numeral 10. The battery 10 is adapted to be repeatedly heat and/or steam sterilized, e.g., in an autoclave, with minimal loss of electrolyte, and is designed for powering orthopedic surgical instruments by supplying power to a D.C. electric motor 12 of the type described in coassigned U.S. Pat. No. 4,728,876, which is incorporated herein by reference, although other uses are contemplated. The battery 10 is preferably of the silver/zinc type containing caustic electrolyte, and is releasably engagable with the motor 12.

Figure 3:
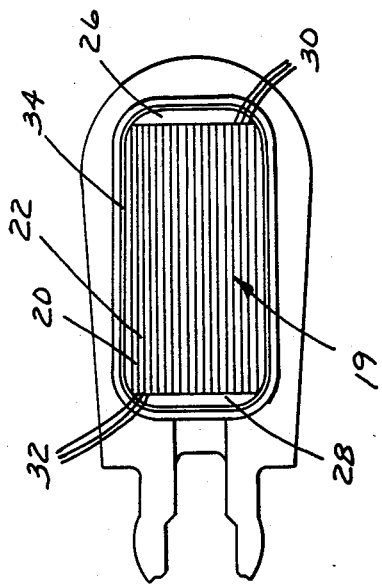
FIG. 3 is an enlarged cross-sectional view substantially along line 3-3 of FIG. 2.
Figure 1:
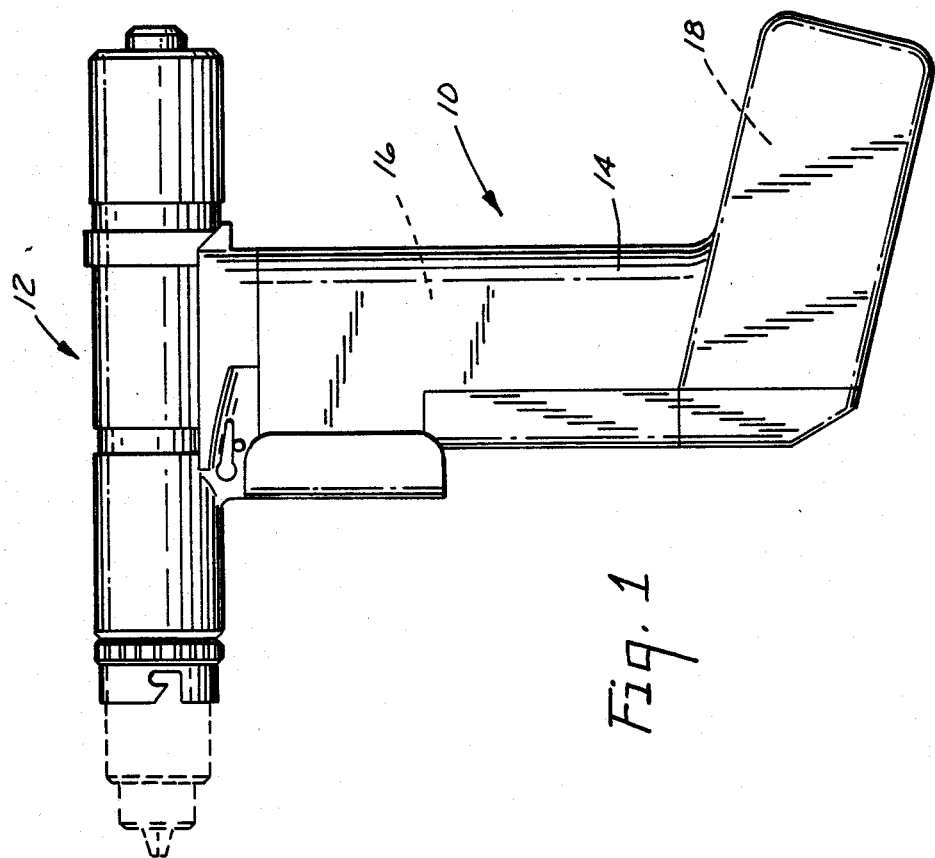
FIG. 1 is left side elevation of a cordless powered drive assembly and a battery of the present invention.

As shown in FIG. 2, the battery 10 generally comprises a casing 14 having walls defining at least one battery cell, but preferably three battery cells. For example, two battery cells 16 and 18 are illustrated in FIG. 2, and a third cell (not shown) is substantially similar to cells 16 and 18 and is positioned immediately adjacent cell 18. Cell 16 is hereafter used to illustrate various aspects of the invention, it being understood that the following discussion also applies to the other battery cells. The battery cell 16 has a generally hexahedronic configuration with rounded edges as defined by the walls of the casing, and includes electrolyte in the cell, an electrode assembly 19 in the cell including cooperating positive and negative electrodes 20 and 22 immersed in the electrolyte, and a vent assembly 24 in the casing 14 for venting gases and pressure during recharging and heat-sterilizing. Two generally planar pads 26 and 28 (FIGS. 2 and 3) of porous material are provided in the cell 16 generally adjacent the electrode assembly 19 and electrodes 20, 22 for holding excess electrolyte. The porous material of the pads 26, 28 has an affinity for the electrolyte sufficiently less than the affinity of the electrode assembly 19 for the electrolyte such that electrolyte in the porous material tends to migrate into the electrode assembly to wet the electrodes while excess electrolyte is stored in the porous material. As used herein, "affinity" refers to the tendency of the material to wick the electrolyte at 23 degrees Celsius and atmospheric pressure. For example, if the electrolyte is an aqueous fluid based electrolyte (e.g., a 25–65% concentration of potassium hydroxide in water, a 25–40% sodium hydroxide in water, or an aqueous-acid electrolyte), the porous material 26, 28 would have a hydrophobicity sufficiently large relative to the electrode assembly 19 that electrolyte in the porous material is able to migrate into the electrode assembly to wet the electrodes 20, 22 while excess electrolyte is stored in the porous material.

The positive and negative electrodes 20, 22 preferably include a plurality of generally planar positive electrode plates 20 and a plurality of generally planar negative electrode plates 22. The positive electrode plates 20 comprise a series of interconnected hydrophilic silver screen electrodes coated with silver oxide powder and wrapped first in a sheet of nylon fabric to prevent or at least slow the growth of dendrites from the electrodes and then in several layers or sheets of an electrolyte-sorbent, hydrophilic material, e.g., cellophane; and the negative electrode plates 22 comprise a series of interconnected hydrophilic silver screen electrodes coated with zinc oxide powder and wrapped in sheets of an electrolyte-sorbent, hydrophilic material, e.g., regenerated cellulose paper. Other types and configurations of electrodes are also contemplated, such as Nickel-Cadmium or lead electrodes, or a series of concentric annular electrodes. The positive and negative electrodes 20, 22 are arranged in alternating, generally parallel juxtaposition with the sheets of electrolyte-sorbent material separating adjacent electrodes and with each electrode having opposite edges at 30 and 32 aligned with corresponding opposite edges 30 or 32 of the other electrodes. The size and configuration of the electrode assembly 19 is such that two peripheral spaces are provided in the battery cell 16 along opposite sides of the assembly, in which the pads 26, 28 of porous material may be positioned. Conductive leads 31 and 33 (FIG. 2) connect the electrodes 20, 22 to the battery terminals 35 and 37, respectively. The three cells of the battery 10, which are connected in series, provide an electrical potential to the motor 12 of about 3.5–4.5 volts, and are capable of current output of up to approximately 100 amps. The battery 10 also has about 12–15 amp hours of capacity at a current draw of 10 amps for over 20 charge-discharge cycles.

The pads 26, 28 of porous material are positioned adjacent the opposite edges 30 and 32, respectively, of the electrodes 20, 22, with the plane of each pad being generally perpendicular to the planes of the electrodes (FIG. 3) so that the distance any excess electrolyte must migrate between the pads and the electrodes is minimized. Alternative arrangements include positioning a plurality of the porous pads between the electrodes, and positioning pads along opposite sides of the electrode assembly parallel to the planes of the electrodes, although positioning the pads 26, 28 along opposite edges 30, 32 of the electrodes 20, 22 perpendicular to the planes of the electrodes is preferred. A thin layer 34 of flexible, hydrophobic fabric material (e.g., polytetrafluoroethylene fabric sold under the trade designation "100% Teflon coalescer fabric" by Prodesco of Perkasie, Pa.) may be provided for substantially enclosing the electrode assembly 19 and pads 26, 28 to facilitate inserting the electrode assembly and pads into the battery cell 16 and to separate them from the casing 14 of the battery cell. The cellophane sheets wrapping the positive electrodes 20 swell when they are hydrated with the electrolyte, causing the electrodes-pads-fabric assembly to expand outwardly against opposite walls of the casing 14 defining the cell to securely fix the position of the assembly in the cell. The resulting pressure reduces the deterioration of the negative electrodes 22 ordinarily due to severe expansion and contraction of the plates during the charge-discharge cycle.

The vent assembly 24 (FIG. 2) provides a passageway 36 through a wall 38 defining the top of the cell 16 between the cell and the atmosphere (the vent assemblies for the other cells are positioned in an upper portion of the front wall defining the cells). The vent assembly 24 includes means in the passageway for allowing gas in the battery cell above a predetermined pressure to escape through the passageway while sealing the passageway against escape of gas below the predetermined pressure, and a curtain 40 of porous polymeric material (e.g., polyvinylidenefluoride, such as sold under the trade designation "Kynar" by Pennwalt Corp. of Philadelphia, Pa., and converted into a porous material by Porex Technologies of Fairburn, Ga.) entirely across the passageway permitting movement of gas through the the curtain while restricting movement of liquid through the curtain and passageway. The curtain material 40 is preferably vacuum loaded or impregnated with hydrophobic material, such as silicone oil (e.g., a 50/50 mixture of the silicone oils sold under the trade designations "#200" silicone oil and "DB-100" silicone oil by Dow Corning Corp. of Midland, Mich.), to increase the resistance of the curtain to penetration by the electrolyte. The vent assembly 24 further includes a socket formed in the top wall 38 of the cell 16 with a through opening at its inner end, and a hollow cylindrical bushing 42 of elastomeric material received in an inner portion of the socket. The curtain 40 is held across the through opening inside the bushing 42. A polished ball 44 (e.g., of borosilicate glass, stainless steel, or elastomeric material) is pressed against an elastomeric 0-ring 46 overlying or, alternatively, forming the inner end of the bushing 42 by a coil spring 48, which is held against the ball by a hollow retaining bushing 50. The retaining bushing 50 has a central through opening forming a portion of passageway 36, and is threadably engaged with an outer portion of the socket. When the pressure in the cell 16 exceeds a predetermined pressure (e.g., 20 to 25 psig (136–171kPa gage)), that pressure will lift the ball 44 from the 0-ring 46 and allow gas to escape through the passageway 36. The curtain 40 is adapted to prevent the escape of any free electrolyte through the passageway 36, it being observed, however, that excess electrolyte will generally be held at a distance from the passageway in the pads 26, 28.

Preferably, the porous material 26, 28 has a surface energy substantially less than the surface energy of the electrode assembly 19 (e.g., the surface energy of the cellophane or electrodes 20, 22), and is resistant to hydrolysis and degradation during extended exposure to caustic electrolyte. Most preferably, the porous material 26, 18 is hydrophobic (e.g., with an "apparent" surface tension less than approximately 35 dynes/cm at 20 degrees Celsius, or being formed of material that has a surface energy less than approximately 35 dynes/cm as a film at 20 degrees Celsius), and the electrode assembly 19 is very hydrophilic (e.g., with an "apparent" surface tension greater than approximately 60 dynes/cm at 20 degrees Celsius) so that aqueous based solutions tend to migrate into the electrode assembly to wet the electrodes.

The "apparent" surface tension of the fabric of the porous material is determined by evaluating the fabric's resistance to wetting by a selected series of liquids (e.g., hydrocarbons and methanol-water solutions at various concentrations) representing a range of surface tensions as follows:

| Hydrocarbon | Surface Tension (dynes/cm at 25C) |
|---|---|
| n-heptane | 19.8 |
| n-octane | 21.4 |
| n-decane | 23.5 |
| n-dodecane | 24.7 |
| n-tetradecane | 26.4 |
| n-hexadecane | 27.3 |

| Methanol/Water (Volume %) | Surface Tension (dynes/cm at 20C) |
|---|---|
| 65/35 | 30 |
| 53/47 | 35 |
| 40/60 | 40 |
| 25/75 | 45 |
| 21/79 | 50 |
| 15/85 | 55 |
| 8.5/91.5 | 60 |
| 5/95 | 65 |
| 0/100 | 73 |

The fabric is conditioned four hours in a 50% relative humidity and 23° C. environment, and placed on a flat, smooth, horizontal surface for testing. Five small drops (e.g., of approximately 0.05 ml volume and 5 mm diameter) of a selected liquid are applied to the fabric and observed for 60 seconds. If three of the five drops wick into the fabric, the procedure is repeated with a liquid having the next higher surface tension. The "apparent" surface tension of the fabric is equal to the surface tension of the the lowest surface tension liquid having three non-wicking drops. This test is a modification of the hydrocarbon resistance test developed by the American Association of Textile Chemists and Colorists (AATCC Test Method 118-1983, Oil Repellency: Hydrocarbon Resistance Test, 61 AATCC Technical Manual 195 (Research Triangle Park, N.C., 1986) incorporated herein by reference). The surface tensions shown for the methanol-water solutions are interpolated from a table entitled "Surface Tension of Methyl Alcohol in Water", CRC Handbook of Chemistry and Physics, at F-34 (69th ed., 1988).

The porous material 26, 28 comprises polymeric material having sufficiently low surface energy and sufficient porosity that the capillary pressure on electrolyte in the pores of the material is appropriate for retaining excess electrolyte while permitting migration of electrolyte from the pores into the electrode assembly 19. The polymeric material 26, 28 preferably has a percent void volume of approximately 65-95 percent available for sorbing electrolyte, and a total void volume sufficient to hold excess electrolyte and prevent the electrolyte from contacting the curtain 40 of the valve assembly 24. For example, material 26, 28 having a total void volume of approximately 2-5 ml may be sufficient in a battery cell holding approximately 19-22 ml of electrolyte.

The pads 26, 28 are formed of material having a "Gurley" densometer (i.e., porosity) number of less than 20 seconds for 100 cc of air at 4.88 in. (124 mm) $H_2O$ pressure to pass through a sample of the material having a circular cross-sectional area of approximately 1 square inch (645 $mm^2$). A temperature of approximately 74-76 F. (23-24 C.) and 50 percent relative humidity are maintained for consistent measurements. The "Gurley" densometer or porosity number may be measured on a densometer of the type sold under the trade designation "Model 4110" densometer by W. & L.E. Gurley of Troy, N.Y., which is preferably calibrated and operated with a Gurley-Teledyne sensitivity meter (Cat. No. 4134/4135). The "Gurley" densometer number is determined in a manner similar to a standard test of the Technical Association of the Pulp and Paper Industry of Atlanta, Ga., for measuring the air resistance of paper (TAPPI Official Test Method T 460 om-83 (incorporated herein by reference).

More specifically, the porous material 26, 28 may comprise a polytetrafluoroethylene (PTFE) felt pad, such as sold under the trade designation "Armalon XT-7550 Teflon" felt by Fairprene Industrial Products Co. Inc. of Fairfield, Conn., having a length and width appropriate for the size of the battery cell 16. Such a PTFE felt pad preferably has an uncompressed thickness or gauge of approximately 0.04-0.08 in. (1-2 mm), e.g., 0.062 in. (1.6 mm), a basis weight of approximately 400-1200 $g/m^2$, e.g., 840 $g/m^2$, and a total weight of approximately 1-5 g/pad, e.g., 2.28 g/pad, in a battery cell 16 having an internal volume of approximately 53 ml and containing approximately 19 ml of electrolyte. The uncompressed thickness of the pad may be measured with a thickness caliper of the type sold under the trade designation "Model 202" by the B.C. Ames Co., Inc. of Waltham, Mass. The void volume of the PTFE felt pad is approximately 83 percent (assuming the PTFE has a density of 2 $g/cm^3$). The PTFE felt pad has a "Gurley" densometer number of approximately 0.15-0.2 seconds, and an "apparent" surface tension of approximately 27-30 dynes/cm.

Alternatively, the porous material 26, 28 may comprise a melt blown nonwoven web of polypropylene or polypropylene and polyethylne. Other types of webs, such as knit or woven fibers, or open cell foams, may also be used. The polypropylene web may be formed of 9 denier 1-7/8 in. (48 mm) long needle tacked staple fibers, such as sold under the trade designation "Type 101" by Hercules Inc. of Wilmington, Del. Such a web preferably has an uncompressed thickness or gauge of approximately 0.1-0.4 in. (2.5-10 mm), e.g., 0.26 in. (6.7 mm), a basis weight of approximately 100-400 $g/m^2$, e.g., 300 $g/m^2$, and a total weight of approximately 0.25-2.5 g/pad, e.g., 0.82 g/pad, in a battery cell 16 having an internal volume of approximately 53 ml and containing approximately 22 ml of electrolyte. The void volume of the polypropylene web is approximately 95 percent (assuming polypropylene has a density of 0.95 $g/cm^3$). The polypropylene web has "Gurley" densometer number of approximately 0.2 seconds, and an "apparent" surface tension of approximately 27-30 dynes/cm. A slightly larger volume of electrolyte is preferred when polypropylene is used than for PTFE felt because the polypropylene web is significantly less dense and has a substantially larger void volume and pore size than the PTFE felt. In addition, polypropylene has a higher surface energy (approximately 34 dynes/cm as a film) than PTFE (which has a surface energy of approximately 20 dynes/cm as a film) so that the polypropylene web has a greater tendency to sorb aqueous electrolyte than the PTFE felt.

A bicomponent melt blown nonwoven web of polypropylene and polyethylene (50-50 ratio) has a thickness or gauge of approximately 0.1–0.3 in. (2.5–8 mm), e.g., 0.2 in. (5 mm), a basis weight of approximately 300–800 $g/m^2$, e.g., 503 $g/m^2$, and a total weight of approximately 1–4 g/pad, e.g., 1.37 g/pad, in a battery cell containing approximately 21 ml of electrolyte. The void volume of the bicomponent web is approximately 90 percent (assuming the material has a density of 0.95 $g/cm^3$). The polypropylene/polyethylene web has a "Gurley" densometer number of approximately 0.1 seconds, and an "apparent" surface tension of approximately 27–30 dynes/cm.

The hydrophobic porous material 26, 28 may be treated with a hydrolyzable surfactant to be hydrophilic so that the material initially wicks the electrolyte to facilitate manufacturing the battery. The surfactant is adapted to deteriorate after the electrolyte is wicked such that the porous material returns to its original hydrophobicity. Suitable surfactants include ionic derivatives of polyethyoxylated alcohols $(R(CH_2-CH_2-O)_nSO_3--Na^+$, where n is 3 to 20), such as the alcohol derivative sold under the trade designation "Texapon ASV-70 Special" by Henkel Corp. of Hoboken, N.J. Alternatives include alkyl benzenesulfonates, phosphate esters, and various amide and ester containing surfactants. The PTFE felt may be treated with a 5% aqueous solution of the "Texapon ASV-70 Special" alcohol derivative, and air dried in a 150 F. oven, thereby causing the felt to be temporarily hydrophilic and capable of wicking the electrolyte. The treated PTFE felt may be inserted with the electrode assembly 19 into the battery cell 16. When potassium hydroxide electrolyte is added, the hydrophilic sulfate element of the surfactant is hydrolyzed off in the caustic environment of the electrolyte, and the PTFE felt returns to its untreated hydrophobicity. This hydrolysis is especially rapid when the battery is heated as during sterilization. Upon repeated exposure to high temperature, the polyethylene oxide portion of the surfactant molecule may also be hydrolyzed off.

As various changes could be made in the above constructions and methods without departing from the scope of the invention, it is intended that all matter contained in the above description or shown in the accompanying drawings shall be interpreted as illustrative and not in a limiting sense.

I claim:

1. A battery adapted to withstand high temperatures, such as generated during heat or steam sterilization, comprising a casing defining at least one battery cell, aqueous fluid electrolyte in the cell, a generally hydrophilic electrode assembly in the cell including cooperating positive and negative electrodes immersed in the electrolyte, a vent in the casing for venting gases and pressure during recharging and heat-sterilizing, and porous material in the cell generally adjacent the electrode assembly for holding excess electrolyte, the porous material being hydrophoboc and having a hydrophobicity sufficiently large relative to the electrode assembly that electrolyte in the porous material tends to migrate into the electrode assembly to wet the electrodes while excess electrolyte is stored in the porous material.

2. A battery according to claim 1 wherein the porous material has a surface energy substantially less than the surface energy of the electrode assembly.

3. A battery according to claim 3 wherein the porous material has an apparent surface tension less than approximately 35 dynes/cm.

4. A battery according to claim 3 wherein the porous material has a percent void volume of approximately 65–95 percent for sorbing electrolyte.

5. A battery according to claim 3 wherein the porous material comprises a polytetrafluoroethylene felt pad.

6. A battery according to claim 5 wherein the electrolyte comprises an aqueous solution of potassium hydroxide of approximately 25–60 solute, the positive electrodes being formed of silver and/or silver oxide and the negative electrodes include zinc and/or zinc oxide.

7. A battery according to claim 3 wherein the porous material comprises a nonwoven, needle-tacked polypropylene web.

8. A battery according to claim 3 wherein the porous web comprises a melt blown nonwoven web of polypropylene or polypropylene and polyethylene.

9. A battery according to claim 2 wherein the porous material comprises polymeric material having a porosity number of less than 20 seconds for 100 cc of air at a pressure of approximately 124 mm $H_2O$ to pass through a portion of the material having a cross-sectional area of approximately 645 $mm^2$.

10. A battery according to claim 1 wherein the material is formed by treating porous material with a surfactant to be hydrophilic so that the material wicks the electrolyte, the surfactant being adapted to deteriorate after the electrolyte is wicked such that the porous material has the aforesaid hydrophobicity.

11. A battery according to claim 1 wherein the cooperating positive and negative electrodes comprises a plurality of generally planar positive electrodes and a plurality of generally planar negative electrodes, the positive and negative electrodes being arranged in alternating, generally parallel juxtaposition with each electrode having at least one edge generally aligned with corresponding edges of the other electrodes; the porous material including a pad positioned adjacent corresponding edges of the electrodes.

12. A battery according to claim 11 wherein each electrode has opposite edges aligned with corresponding opposite edges of the other electrodes, the porous material including two pads positioned adjacent opposite side edges of the electrodes.

13. A battery according to claim 12 wherein the pads are generally planar and each pad is generally perpendicular to the planes of the electrodes.

14. A battery according to claim 13 further including a layer of flexible material substantially enclosing the electrode assembly and pads and separating the electrode assembly and pads from the casing of the battery cell, the electrode assembly including sheets of electrolyte sorbent material separating adjacent electrodes, the sheets of electrolyte sorbent material being hydrophilic.

15. A battery according to claim 1 wherein the vent has a passageway between the battery cell and the atmosphere, means in the passageway for allowing gas in the battery cell above a predetermined pressure to escape through the passageway while sealing the passageway against escape of gas below the predetermined pressure, and a curtain of polymeric material across the passageway permitting movement of gas through the the curtain while restricting movement of liquid through the curtain and passageway.

16. A battery according to claim 15 wherein the curtain comprises polymeric material vacuum-impregnated with a hydrophobic liquid.

* * * * *

UNITED STATES PATENT AND TRADEMARK OFFICE
CERTIFICATE OF CORRECTION

PATENT NO. : 4,892,794

DATED : January 9, 1990

INVENTOR(S) : Matthew T. Scholz

It is certified that error appears in the above-identified patent and that said Letters Patent is hereby corrected as shown below:

Col. 1, line 29, "ha" should read --has--.

Col. 4, line 24, "the" second occurrence, should be deleted.

Col. 4, line 61, "18" should read --28--.

Col. 5, line 37, "the" second occurrence, should be deleted.

Col. 6, line 40, "polyethylne" should read --polyethylene--.

Col. 7, line 60, "hydrophoboc" should read --hydrophobic--.

Col. 8, line 1, "3" should read --2--.

Col. 8, line 11, after "25-60" insert --percent--.

Col. 8, line 63, "the" should be deleted.

Signed and Sealed this

Nineteenth Day of March, 1991

Attest:

HARRY F. MANBECK, JR.

Attesting Officer

Commissioner of Patents and Trademarks